US005189443A

United States Patent [19]

Arashima et al.

[11] Patent Number: 5,189,443

[45] Date of Patent: Feb. 23, 1993

[54] RECORDING HEAD HAVING STRESS-MINIMIZING CONSTRUCTION

[75] Inventors: Teruo Arashima, Yokohama; Makiko Kimura, Sagamihara; Toshio Kashino, Chigasaki; Hiroshi Sugitani, Machida; Yoshifumi Hattori, Yamato; Masami Ikeda, Tokyo; Asao Saito, Yokohama; Kazuaki Masuda, Sagamihara; Akio Saito, Hadano; Tsuyoshi Orikasa, Kasukabe, all of Japan

[73] Assignee: Canon Kabushiki Kaisha, Tokyo, Japan

[21] Appl. No.: 905,234

[22] Filed: Jun. 29, 1992

Related U.S. Application Data

[63] Continuation of Ser. No. 583,565, Sep. 17, 1990, abandoned.

[30] Foreign Application Priority Data

Sep. 18, 1989 [JP] Japan .................................. 1-241026

[51] Int. Cl.[5] ......................... G01D 15/16; G01D 9/00

[52] U.S. Cl. .................................. 346/140 R; 346/1.1

[58] Field of Search ............................. 346/140 R, 1.1

[56] References Cited

U.S. PATENT DOCUMENTS 4,533,927 8/1985 Iwagami et al. .................... 346/140
4,599,528 7/1986 Doring et al. .................. 346/140 R
4,725,851 2/1988 Sutera et al. .......................... 346/75
4,768,266 9/1988 DeYoung ........................... 29/25.35
4,779,099 10/1988 Lewis .................................. 346/1.1
4,962,391 10/1990 Kitahara et al. ................ 346/140 R
4,967,204 10/1990 Terasawa et al. .................. 346/1.1

FOREIGN PATENT DOCUMENTS 3438033 4/1986 Fed. Rep. of Germany .
048009 9/1990 Japan ............................. 346/140 R

OTHER PUBLICATIONS

W. Crooks, et al., "Membrane Nozzle Array With Reduced Thermal Expansion Mismatch Effect", *IBM Technical Disclosure Bulletin*, vol. 23, No. 2, p. 783 (Jul., 1980).

L. Missel, et al. "Bonding Jet Nozzle Plates To Base Plates", *IBM Technical Disclosure Bulletin*, vol. 21, No. 1, p. 307 (Jun. 1978).

*Primary Examiner*—Benjamin R. Fuller
*Assistant Examiner*—Eric Frahm
*Attorney, Agent, or Firm*—Fitzpatrick, Cella, Harper & Scinto

[57] ABSTRACT

An ink jet cartridge includes a top plate having an orifice plate in which ejection outlets for permitting ejection of ink are formed and a portion for defining ink passages communicating with the ink ejection outlets, a heater board joined with the top plate to define the ink passage, a thin plate having a connecting region for pressing and fixing the orifice plate to the heater board, and an ink container for containing the ink to be supplied to the ink passages, wherein the thin plate is connected with the orifice plate on at least one of four sides of the orifice plate.

5 Claims, 6 Drawing Sheets

RECORDING HEAD HAVING STRESS-MINIMIZING CONSTRUCTION

This application is a continuation of application Ser. No. 583,656, filed Sept. 17, 1990, now abandoned.

FIELD OF THE INVENTION AND RELATED ART

The present invention relates to an ink jet cartridge integrally having an ink jet recording head and an ink container for containing the ink to be supplied to the ink jet head. It also relates to an ink jet recording apparatus incorporating the ink jet cartridge on a reciprocably movable carriage.

Known ink jet recording apparatus wherein ink is ejected onto a recording material to effect recording include a type wherein a piezoelectric element is used to pressurize the liquid in a ink passage to eject a fine droplet, and a type wherein a heat generating element is disposed in the ink passage to instantaneously heat the ink to form a bubble by which a liquid droplet is ejected. The thermal energy type is noteworthy because the recording density can easily be increased, because mass-production is easy and because the manufacturing cost is low. These benefits result from the characteristic that liquid jet recording outlet such as orifices or the like for ejecting the recording liquid droplets can be arranged with a high density so that high resolution printing is possible, and the entire size of the recording head can be easily reduced.

In a type of ink jet recording apparatus, it is used with a disposable ink jet cartridge having, as a unit, a recording head and an ink container containing ink to be supplied to the recording head.

The recording head in the ink jet cartridge has a structure, for example, as shown in FIGS. 7A and 7B.

It comprises a heater board 1 having a silicon substrate, electrothermal transducers (ejection heaters) (not shown) and aluminum or other wiring for supplying electric power thereto, wherein the electrothermal transducer and the wiring are made through a film processing process. A top plate 4 has an orifice plate 4*a* containing ejection outlets 2 through which the ink is ejected. The top plate 4 is provided with recesses to define ink passages when it is combined with the heater board.

The heater board 1 and the top plate 4 are supported by a supporting member 3 and are supported by an outer casing 6 of an ink supplying member for supplying the ink to the ink passage 7.

When the heater board 1 and the top plate 4 are supported in this manner, it is probable that a stepped portion is formed between the orifice plate 4*a* of the top plate 4 and the outer casing 6 of the ink supply member or between the supporting member 3 and the orifice plate 4*a*. The stepped portion may adversely affect the cleaning operation or capping operation relative to the ejection side surface of the recording head.

More particularly, since the stepped portion is formed on the surface which is to be cleaned or capped, the ink may remain at the step following the cleaning operation, or after capping a gap will be formed deteriorating the seal.

In order to avoid this, a front seal plate 10 is mounted to the supporting member 3 and the outer casing 6 of the ink supplying member, so as to remove the step and thereby provide a smooth ejection side surface of the head. The seal plate (10) has an opening to expose the ejection outlets 2 and to cover the marginal portion of the orifice plate 4*a*.

The front seal plate 10, the heater board 1, the top plate 4 and the supporting member 3 of the recording head are made of different materials. Therefore, they undergo thermal expansion in different amounts when the ambient temperature changes or when the temperature of the recording head increases as a result of the printing operation.

Due to the different coefficients of thermal expansion, the front seal plate 10 experiences compression or tensile stress when there is an ambient temperature change or the like. As described, the front seal plate 10 is pressed and bonded around the entire periphery of the orifice plate 4*a*, and therefore, the stress produced in the front seal plate 10 is directly applied to the orifice plate 4*a*. The orifice plate 4*a* in which the ejection outlets 2 are formed is made of a molded resin having a small thickness such as 20–40 microns, and therefore, a cracks can easily be produced therein even with a slight stress. When a crack is produced in the orifice plate 4*a*, the direction of the ink ejected from the orifices can vary, resulting in to the formed image, and therefore, reducing the print quality.

It is difficult to use the same thermal expansion material for all the parts, because of the cost and differences in the respective functions of those parts. If the front seal plate 10 is not pressed and bonded to the orifice plate 4*a*, the orifice plate 4*a* may be separated with the result of imprecise ink ejection or degraded print quality.

SUMMARY OF THE INVENTION

Accordingly, it is a principal object of the present invention to provide an ink jet cartridge and an ink jet recording apparatus having the ink jet cartridge, wherein high quality print can be reliably maintained under various ambient conditions.

The inventors have conducted various experiments and made various investigations as to the strains resulting from differences in the thermal expansion coefficients of the constituent materials, and have found that by releasing a part of the connection between the front seal plate and the orifice plate, the strain can be effectively removed or suppressed.

According to an aspect of the present invention, there is provided an ink jet cartridge comprising a top plate having an orifice plate in which ejection outlets for permitting ejection of ink is formed and a portion for defining ink passages communicating with the ink ejection outlets, a base plate joined with the top plate to define the ink passage, a thin plate having a connecting region for pressing and fixing the orifice plate to the base member, and an ink container for containing the ink to be supplied to the ink passages, wherein the thin plate is connected with the orifice plate at at least one of three sides of the orifice plate.

According to another aspect of the present invention, there is provided an ink jet cartridge comprising a top plate having an orifice plate in which ejection outlets for permitting ejection of ink is formed and a portion for defining ink passages communicating with the ink ejection outlets, a base plate joined with the top plate to define the ink passage, a thin plate having a connecting region for pressing and fixing the orifice plate to the base member, an ink container for containing the ink to be supplied to the ink passages, wherein the thin plate is connected with the orifice plate at at least one of three sides of the orifice plate, capping means contactable to the ejection side surface of the cartridge to cap it.

According to a further aspect of the present invention, there is provided an ink jet cartridge comprising an ink jet cartridge, itself comprising a top plate having an orifice plate in which ejection outlets for permitting ejection of ink are formed and a portion for defining ink passages communicating with the ink ejection outlets, a base plate joined with the top plate to define the ink passage, a thin plate having a connecting region for pressing and fixing the orifice plate to the base member, an ink container for containing the ink to be supplied to the ink passages, wherein the orifice plate and the thin plate are connected in a limited zone.

According to the present invention, among the four peripheral sides of the orifice plate, at least one side does not include the bonding between the front seal plate and the orifice plate. Therefore, even if the front seal experiences some force due to in the thermal expansion, the force is eased by the non-bonding region, and therefore, the stress to the orifice plate is suppressed to a significant extent, by which the deformation of the orifice plate and the development of cracks can be prevented.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

FIGS. 2, 3, 4, 5 and 6 illustrate an ink jet unit IJU, an ink jet heat IJH, an ink container IT, an ink jet cartridge IJC, a head carriage HC and a main assembly IJRA of an ink jet recording apparatus, according to an embodiment of the present invention, and relations among them. The structures of the respective elements will be described in the following.

Figure 2:
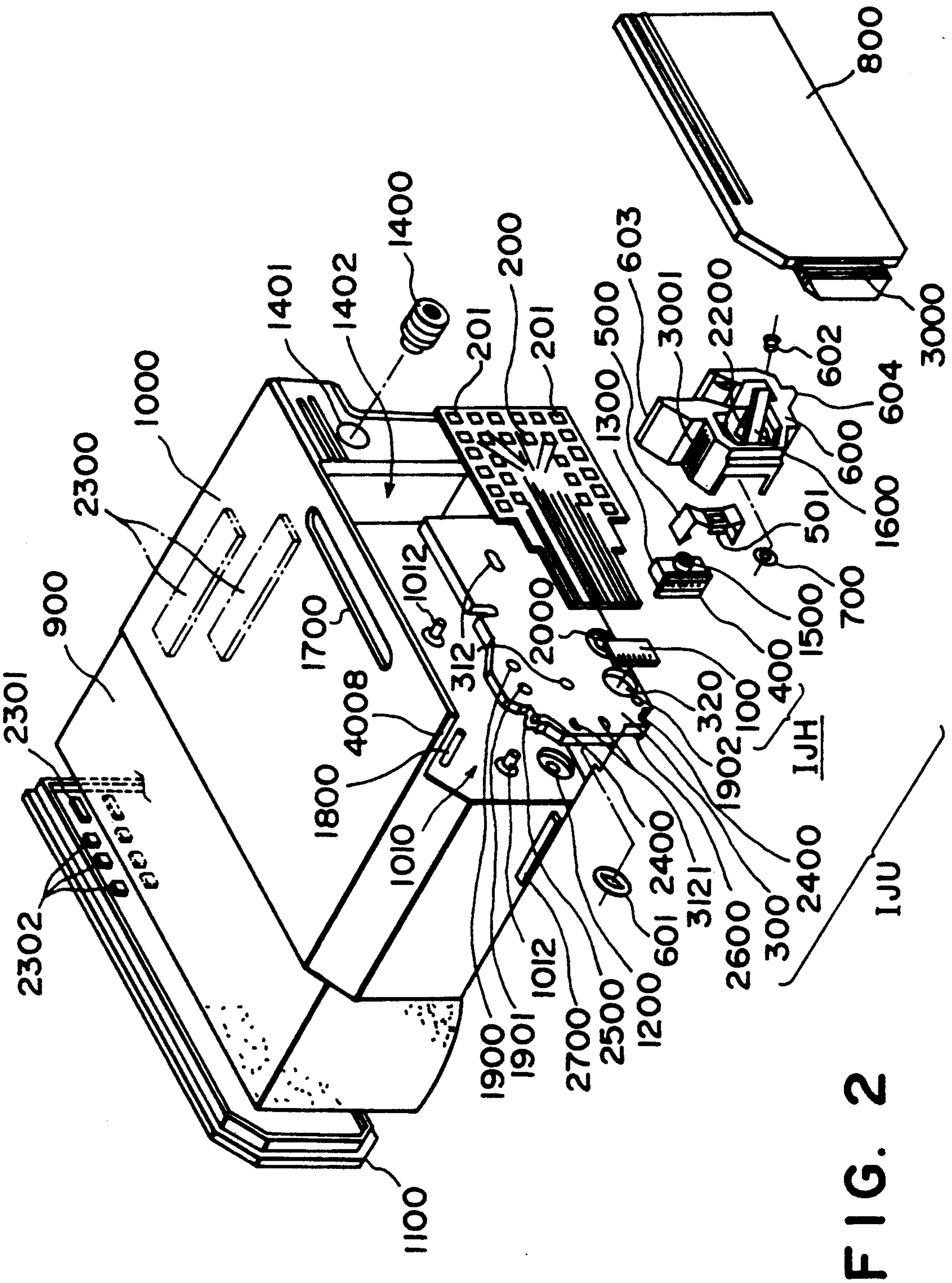
FIG. 2 is an exploded perspective view of an ink jet cartridge according to an embodiment of the present invention.
Figure 3:
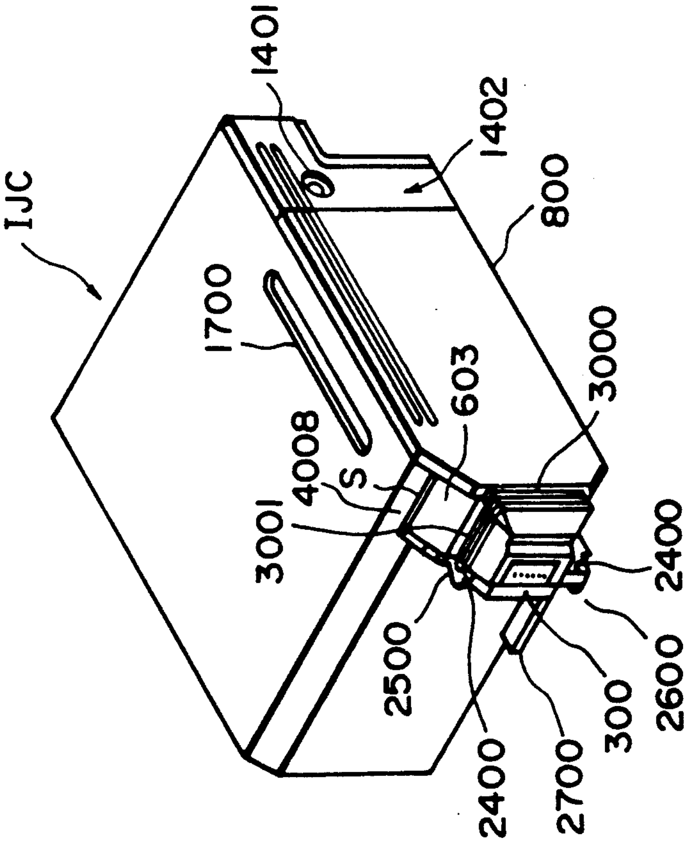
FIG. 3 is a perspective view of an outer appearance of the ink jet cartridge.

As will be understood from the perspective view of FIG. 3, the ink jet cartridge IJC in this embodiment has a relatively large ink accommodation space, and an end portion of the ink jet unit IJU slightly projects from the front side surface of the ink container IT. The ink jet cartridge IJC is mountable at the correct position on the carriage HC (FIG. 5) of the ink jet recording apparatus main assembly IJRA by proper positioning means and has electric contacts, which will be described in detail hereinafter. This embodiment shows a disposable type head detachably mountable on the carriage AC. The structures disclosed in FIGS. 2–6 contain various novel features, which will first be described generally.

(i) Ink Jet Unit IJU

The ink jet unit IJU is of the bubble jet recording type and uses electrothermal transducers which generate thermal energy in response to electric signals to produce film boiling of the ink.

Referring to FIG. 2, the unit comprises a heater board 100 having electrothermal transducers (ejection heaters) arranged in a line on a silicon substrate and electric lead lines made of aluminum or the like to supply electric power thereto. The electrothermal transducer and the electric leads are formed by a film forming process. A wiring board 200 is associated with the heater board 100 and includes wiring corresponding to the wiring of the heater board 100 (connected by the wire bonding technique, for example) and pads 201 disposed at an end of the wiring to receive electric signals from the main assembly of the recording apparatus.

A top plate 1300 is provided with grooves which define partition walls for separating adjacent ink passages and a common liquid chamber for accommodating the ink to be supplied to the respective ink passages. The top plate 1300 is formed integrally with an ink jet opening 1500 for receiving the ink supplied from the ink container IT and directing the ink to the common chamber, and also with an orifice plate 400 having the plurality of ejection outlets corresponding to the ink passages. The material used to make this top plate is preferably integrally molded of polysulfone, but may be another molding resin material.

A supporting member 300 is made of metal, for example, and functions to support a backside of the wiring board 200 in a plane, and constitutes a bottom plate of the ink jet unit IJU. A confining spring 500 is in the form of "M" having a central portion applying light pressure to the common chamber, and a clamp 501 applies a substantial line pressure to a part of the liquid passage, preferably the part in the neighborhood of the ejection outlets. The confining spring 500 has legs for clamping the heater board 100 and the top plate 1300 by penetrating through the openings 3121 of the supporting plate 300 and engaging the back surface of the supporting plate 300. Thus, the heater board 100 and the top plate 1300 are clamped by the concentrated urging force by the legs and the clamp 501 of the spring 500. The supporting plate 300 has positioning openings 312, 1900 and 2000 engageable with two positioning projections 1012 and positioning and fuse-fixing projections 1800 and 1801 of the ink container IT. It further includes projections 2500 and 2600 at its backside for the positioning relative to the carriage HC of the main assembly IJRA.

In addition, the supporting member 300 has a hole 320 through which an ink supply pipe 2200, which will be described hereinafter, is penetrated for supplying ink from the ink container. The wiring board 200 is mounted on the supporting member 300 by a bonding agent or the like. The supporting member 300 is provided with recesses 2400 and 2400 adjacent the positioning projections 2500 and 2600.

Figure 5:
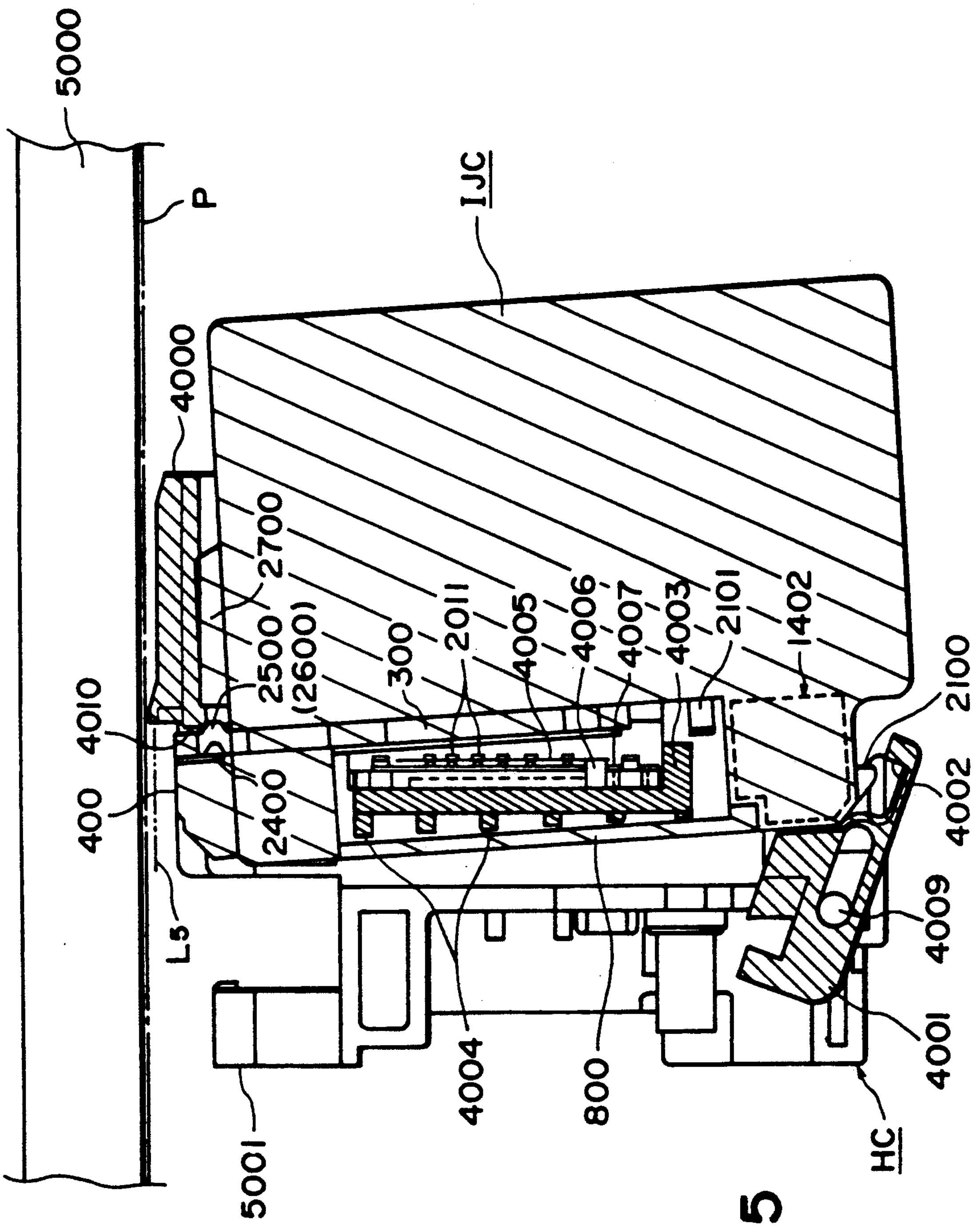
FIG. 5 is a top plan view of the ink jet cartridge to be mounted on the carriage of the ink jet apparatus.

As shown in FIG. 3, the assembled ink jet cartridge IJC has a head projected portion having three sides provided with plural parallel grooves 3000 and 3001. The recesses 2400 and 2400 are located at extensions of the parallel grooves at the top and bottom sides to prevent the ink or foreign matter moving along the groove from reaching the projections 2500 and 2600. The covering member 800 having the parallel grooves 3000, as shown in FIG. 5, constitutes an outer casing of the ink jet cartridge IJC and cooperates with the ink container to define a space for accommodating the ink jet unit IJU. The ink supply member 600 having the parallel groove 3001 has an ink conduit pipe 1600 communicating with the above-described ink supply pipe 2200 and is cantilevered at the supply pipe 2200 side. In order to assure the capillary action at the fixed side of the ink conduit pipe 1600 and the ink supply pipe 2200, a sealing pin 602 is inserted.

A gasket 601 seals the connecting portion between the ink container IT and the supply pipe 2200. A filter 700 is disposed at the container side end of the supply pipe. The ink supply member 600 is molded, and therefore, can be produced at low cost with high positional accuracy. In addition, the cantilevered structure of the conduit 1600 assures the press-contact between the conduit 1600 and the ink inlet 1500 even if the ink supply member 600 is mass-produced.

In this embodiment, the complete communicating state can be assuredly obtained simply by applying sealing bonding agent from the ink supply member side under the press-contact state. The ink supply member 600 may be fixed to the supporting member 300 by inserting and penetrating backside pins (not shown) of the ink supply member 600 through the openings 1901 and 1902 of the supporting member 300 and by heat-fusing the portion where the pins are projected through the backside of the supporting member 300. The slight projected portions thus heat-fused are accommodated in recesses (not shown) in the ink jet unit (IJU) mounting side surface of the ink container IT, and therefore, the unit IJU can be correctly positioned.

(ii) Ink Container IT

The ink container comprises a main body 1000, an ink absorbing material and a cover member 1100. The ink absorbing material 900 is inserted into the main body 1000 from the side opposite from the unit (IJU) mounting side, and thereafter, the cover member 1100 seals the main body.

The ink absorbing material 900 is thus disposed in the main body 1000. The ink supply port 1200 functions to supply the ink to the ink jet unit IJU comprising the above-described parts 100–600, and also functions as an ink injection inlet to permit supplying an initial ink supply to the absorbing material 900 before the unit IJU is mounted to the portion 1010 of the main body.

In this embodiment, the ink may be supplied through an air vent port and this supply opening. In order to allow a good supply of ink ribs 2300 is formed on the inside surface of the main body 1000, and ribs 2301 and 2302 are formed on the inside of the cover member 1100, which are effective to provide within the ink container an ink existing region extending continuously from the air vent port side to that corner portion of the main body which is most remote from the ink supply opening 1200. Therefore, in order to evenly distribute the ink, it is preferable that the ink is supplied through the supply opening 1200. This ink supply method is quite effective. The number of ribs 2300 in this embodiment is four, and the ribs 2300 extend parallel to a movement direction of the carriage adjacent the rear side of the main body of the ink container, by which the absorbing material 900 is prevented from closely contacted to the inner surface of the rear side of the main body. The ribs 2301 and 2302 are formed on the inside surface of the cover member 1100 at a position which is substantially an extension of the ribs 2300, however, as contrasted to the large rib 2300, the size of the ribs 2301 and 2302 are small as if it is divided ribs, so that the air existing space is larger with the ribs 2301 and 2302 than with the rib 2300. The ribs 2302 and 2301 are distributed on the entire area of the cover member 1100, and the area thereof is not more than one half of the total area. Because of the presence of the ribs, the ink in the corner region of the ink absorbing material which is most remote from the supply opening 1200 can be stably and reliably supplied to the inlet opening by capillary action. The cartridge is provided with an air vent port for communication between the inside of the cartridge with the outside air. Inside the vent port 1400, there is a water repellent material 1400 to prevent the inside ink from leaking outside through the vent port 1400.

The ink accommodating space in the ink container IT is shaped like a substantially rectangular parallelepiped, and the long side faces in the direction of carriage movement, and therefore, the above-described rib arrangements are particularly effective. When the long side extends along the movement direction of the carriage, or when the ink containing space is in the form of a cube, the ribs are preferably formed on the entire surface of the inside of the cover member 1100 to stabilize the ink supply from the ink absorbing material 900. The cube configuration is preferable from the standpoint of accommodating as much as possible ink in limited space. However, from the standpoint of using the ink with minimum an available part in the ink container, the provisions of the ribs formed on the two surfaces constituting a corner.

In this embodiment, the inside ribs 2301 and 2302 of the ink container IT are substantially uniformly distributed in the direction of the thickness of the ink absorbing material having the rectangular parallelepiped configuration. Such a structure is significant, since the air pressure distribution in the ink container IT is kept uniform when the ink in the absorbing material is consumed so that the quantity of the remaining ink unavailable is substantially zero. It is preferable that the ribs are disposed on the surface or surfaces outside a circular arc having the center at the projected position on the ink supply opening 1200 on the top surface of the rectangular ink absorbing material and having a radius which is equal to the long side of the rectangular shape, since then the ambient air pressure can be quickly established for the ink absorbing material present outside the circular arc. The position of the air vent of the ink container IT is not limited to this position, and other positions may be good for introducing the ambient air into the position where the ribs are disposed.

In this embodiment, the backside of the ink jet cartridge IJC is flat, and therefore, the space required when mounted in the apparatus is minimized, while maintaining the maximum ink accommodating capacity. Therefore, the size of the apparatus can be reduced, and simultaneously, the frequency of the cartridge exchange is minimized. Utilizing the rear space of the space used for unifying the ink jet unit IJU, a projection for the air vent port 1401. The inside of the projection is substantially empty, and the vacant space 1402 functions to supply the air into the ink container IT uniformly in the direction of the thickness of the absorbing material. Because of these features described above, the cartridge as a whole offers better performance than the conventional cartridge. The air supply space 1402 is much larger than that in conventional cartridges. In addition, the air vent port 1401 is at an upper position, and therefore, if the ink escapes from the absorbing material for some reason or another, the air supply space 1402 can retain the ink to permit such ink to be absorbed back into the absorbing material. Therefore, the wasteful consumption of the ink can be avoided.

Figure 4:
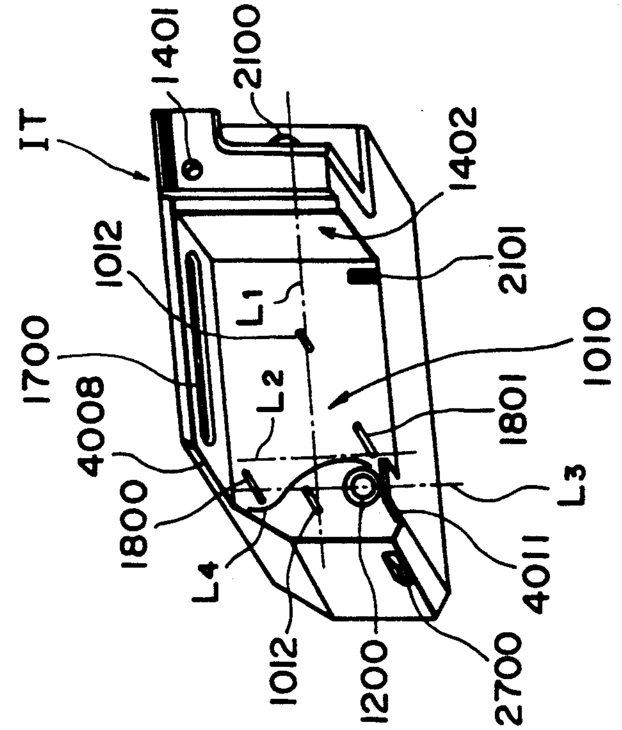
FIG. 4 is a perspective view of an outer appearance of the ink container of the ink jet cartridge as seen from the side at which the ink jet recording heat is mounted.

Referring to FIG. 4, there is shown a structure of a surface of the ink container IT to which the unit IJU is mounted. Two positioning projections 1012 are on a line L1 which passes through the substantial center of the array of the ejection outlets in the orifice plate 400 and is parallel with the bottom surface of the ink container IT or parallel to the ink container supporting reference surface of the carriage. The height of the projections 1012 is slightly less than the thickness of the supporting member 300, and the projections 1012 function to correctly position the supporting member 300. On an extension (right side) in this FIG., there is a pawl (or latch) 2100 with which a right angle engaging surface 4002 of a carriage positioning hook 4001 is engageable. Therefore, the force for the positioning of the ink jet unit relative to the carriage acts in a plane parallel to a reference plane including the line L1. These relationships are significant, since the accuracy of the ink container positioning becomes equivalent to the positioning accuracy of the ejection outlet of the recording head, which will be described hereinafter in conjunction with FIG. 5.

Projections 1800 and 1801 correspond to the fixing holes 1900 and 2000 for fixing the supporting member 300 to the side of the ink container IT, and are longer than the projections 1012, so that they penetrate through the supporting member 300, and the projected portions are fused to fix the supporting member 300 to the side surface. Line L3 passing through the projection 1800 and perpendicular to the line L1, and line L2 passing through the projection 1801 and perpendicular to the line L1, are drawn. The center of the supply opening 1200 lies substantially on the line L3, and the connection between the supply opening 1200 and a supply pipe 2200 is stabilized, and therefore, even if the cartridge falls, or even if a shock is imparted to the cartridge, the force applied to the connecting portion can be minimized. In addition, since the lines L2 and L3 are not overlapped, and since the projections 1800 and 1801 are disposed adjacent to that projection 1012 which is nearer to the ink ejection outlets of the ink jet head, the positioning of the ink jet unit relative to the ink container is further improved. In this FIG., a curve L4 indicates the position of the outer wall of the ink supply member 600 when it is mounted. Since the projections 1800 and 1801 are along the curve L4, the projections are effective to provide sufficient mechanical strength and positional accuracy against the weight of the end structure of the head IJH.

An end projection 2700 of the ink container IT is engageable with a hole formed in the front plate 4000 of the carriage to prevent the ink cartridge from being substantially displaced out of the position. A stopper 2101 is engageable with a rod (not shown) of the carriage HC, and when the cartridge IJC is correctly mounted with rotation, which will be described hereinafter, the stopper 2101 take a position below the rod, so that even if an upward force tending to disengage the cartridge from the correct position is applied, the correct mounted state is maintained. The ink container IT is covered with a cover 800 after the unit IJU is mounted thereto. Then, the unit IJU is enclosed therearound except for the bottom thereof. However, the bottom opening thereof permits the cartridge IJC to be mounted on the carriage HC, and is close to the carriage HC, and therefore, the ink jet unit is substantially enclosed around its six sides. Therefore, the heat generated by the ink jet head IJH accumulates in the enclosed space and is effective to maintain the temperature of the enclosed space.

However, if the cartridge IJC is continuously operated for a long period of time, the temperature slightly increases. To prevent excessive temperature increase, the top surface of the cartridge IJC is provided with a slit 1700 having a width smaller than the enclosed space, by which the spontaneous heat radiation is enhanced to prevent this temperature rise, while the uniform temperature distribution of the entire unit IJU is not influenced by the ambient conditions.

After the ink jet cartridge IJC is assembled, the ink is supplied from the inside of the cartridge to the chamber in the ink supply member 600 through a supply opening 1200, the hole 320 of the supporting member 300 and an inlet formed in the backside of the ink supply member 600. After leaving the chamber of the ink supply member 600, the ink is supplied to the common chamber through the outlet, supply pipe and an ink inlet 1500 formed in the top plate 1300. The connecting portion for the ink communication is sealed by silicone rubber or butyl rubber or the like to assure a hermetical seal.

In this embodiment, the top plate 1300 is made of resin material resistant to the ink, such as polysulfone, polyether sulfone, polyphenylene oxide, or polypropylene. It is integrally molded in a mold together with an orifice plate portion 400.

As described in the foregoing, the integral part comprises the ink supply member 600, the top plate 1300, the orifice plate 400 and parts integral therewith, and the ink container body 1000. Therefore, the accuracy in the assembling is improved, and is convenient in the mass-production. The number of parts is less than in conventional devices, so that optimal performance can be assured.

In this embodiment, as shown in FIGS. 2–4, the configuration after assembly is such that the top portion 603 of the ink supply member 600 cooperates with an end of the top thereof having the slits 1700, so as to form a slit S, as shown in FIG. 3. The bottom portion 604 cooperates with fed side end 4011 of a thin plate to which the bottom cover 800 of the ink container IT is bonded, so as to form a slit (not shown) similar to the slit S. The slits between the ink container IT and the ink supply member 600 are effective to enhance the heat radiation, and are also effective to prevent any unexpected pressure applied to the ink container IT from influencing directly the supply member or to the ink jet unit IJT.

The above-described various structures are individually effective to provide the respective advantages, and also they are most effective when they are combined with each other.

(iii) Mounting of the Ink Jet Cartridge IJC to the Carriage HC

In FIG. 5, a platen roller 5000 guides the recording medium P from the bottom to the top. The carriage HC is movable along the platen roller 5000. The carriage HC comprises a front plate 4000, a supporting plate 4003 for electric connection and a positioning hook 4001. The front plate 400 has a thickness of 2 mm, and is disposed closer to the platen. The front plate 4000 is disposed close to the front side of the ink jet cartridge IJC, when the cartridge IJC is mounted to the carriage. The supporting plate 4003 supports a flexible sheet 4005 having pads 2011 corresponding to the pads 201 of the wiring board 200 of the ink jet cartridge IJC and a rubber pad sheet 4007 for producing elastic force for urging the backside of the flexible sheet 4005 against the pads 2001. The positioning hook 4001 functions to fix the ink jet cartridge IJC to the recording position. The front plate 4000 is provided with two positioning projection surfaces 4010 corresponding to the positioning projections 2500 and 2600 of the supporting member 300 of the cartridge described hereinbefore. After the cartridge is mounted, the front plate receives the force in the direction perpendicular to the projection surfaces 4010. Therefore, plural reinforcing ribs (not shown) are extended in the direction of the force at the platen roller side of the front plate. The ribs project toward the platen roller slightly (approximately 0.1 mm) from the front side surface position L5 when the cartridge IJC is mounted, and therefore, they function as head protecting projections. The supporting plate 4003 is provided with plural reinforcing ribs 4004 extending in a direction perpendicular to the above-described front plate ribs. The reinforcing ribs 4004 have heights which decreases from the plate roller side to the hook 4001 side. By this, the cartridge is inclined as shown in FIG. 5, when it is mounted.

The supporting plate 4003 is provided with two additional positioning surfaces 4006 at the lower left portion, that is, at the position closer to the hook. The positioning surfaces 4006 correspond to projection surfaces 4010 by the additional positioning surfaces 4006, the cartridge receives the force in the direction opposite from the force received by the cartridge by the above-described positioning projection surfaces 4010, so that the electric contacts are stabilized. Between the upper and lower projection surfaces 4010, there is disposed a pad contact zone, so that the amount of deformation of the projections of the rubber sheet 4007 corresponding to the pad 2011 is determined. When the cartridge IJC is fixed at the recording position, the positioning surfaces are brought into contact with the surface of the supporting member 300. In this embodiment, the pads 201 of the supporting member 300 are distributed so that they are symmetrical with respect to the above-described line L1, and therefore, the amount of deformation of the respective projections of the rubber sheet 4007 is made uniform to stabilize the contact pressure of the pads 2011 and 201. In this embodiment, the pads 201 are arranged in two columns and upper and bottom two rows.

The hook 4001 is provided with an elongated hole engageable with a fixed pin 4009. Using the movable range provided by the elongated hole, the hook 4001 rotates in the counterclockwise direction, and thereafter, it moves leftwardly along the platen roller 5000, by which the ink jet cartridge IJC is positioned to the carriage HC. Such a movable mechanism of the hook 4001 may be accomplished by another structure, but it is preferable to use a lever or the like. During the rotation of the hook 4001, the cartridge IJC moves from the position shown in FIG. 5 to the position toward the platen side, and the positioning projections 2500 and 2600 come to the position where they are engageable to the positioning surfaces 4010. Then, the hook 4001 is moved leftwardly, so that the hook surface 4002 is contacted to the pawl 2100 of the cartridge IJC, and the ink cartridge IJC rotates about the contact between the positioning surface 2500 and the positioning projection 4010 in a horizontal plane, so that the pads 201 and 2011 are contacted to each other. When the hook 4001 is locked and retained at the fixing or locking position, complete contact is simultaneously established between the pads 201 and 2011, between the positioning portions 2500 and 4010, between the standing surface 4002 and the standing surface of the pawl and between the supporting member 300 and the positioning surface 4006, and therefore, the cartridge IJC is completely mounted on the carriage.

(iv) General Arrangement of the Apparatus

Figure 6:
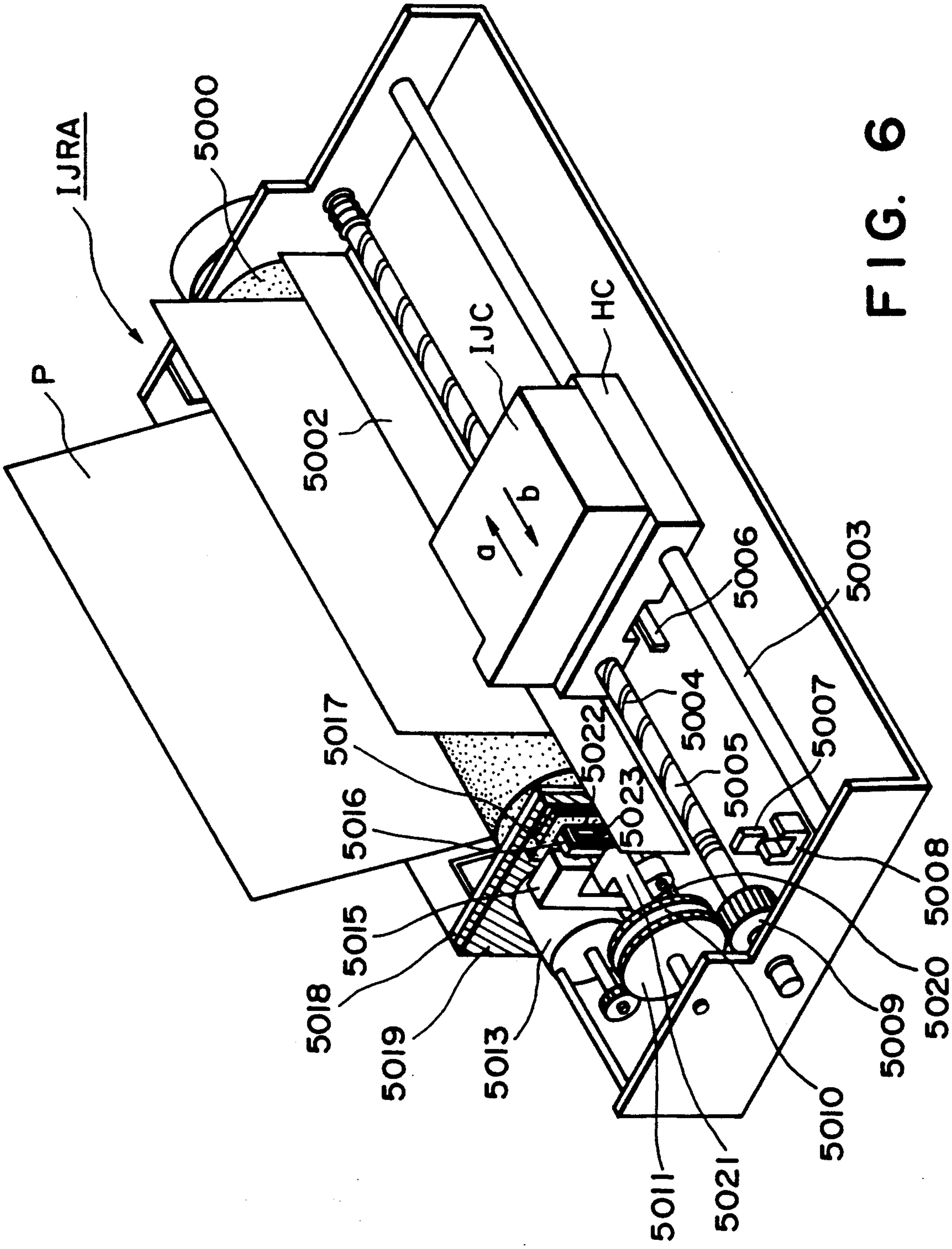
FIG. 6 is a perspective view of an ink jet apparatus according to an embodiment of the present invention.

FIG. 6 is a perspective view of an ink jet recording apparatus IJRA in which the present invention is used. A lead screw 5005 rotates by way of drive transmission gears 5011 and 5009 under the forward and backward rotation of a driving motor 5013. The lead screw 5005 has a helical groove 5004 with which a pin (not shown) of the carriage HC is engaged, by which the carriage HC can be reciprocated in directions a and b. A sheet confining plate 5002 confines the sheet on the platen over the carriage movement range. Home position detecting means 5007 and 5008 are in the form of a photocoupler to detect the presence of a lever 5006 of the carriage, in response to which the rotational direction of the motor 5013 is reversed. A supporting member 5016 supports the front side surface of the recording head to a capping member 5022 for capping the recording head. Sucking means 5015 functions to suck the recording head through the opening 5023 of the cap so as to clear the recording head.

A cleaning blade 5017 is reciprocably toward, front and rear by a moving member 5019. These elements are supported on the supporting frame 5018 of the main assembly of the apparatus. The blade may be in another form, more particularly, a known cleaning blade. A lever 5021 is used to sense when to start the sucking recovery operation and is moved with the movement of a cam 5020 engaging the carriage, and the driving force from the driving motor is controlled by known transmitting means such as a clutch or the like.

The capping, cleaning and sucking operations can be performed when the carriage is at the home position by the lead screw 5005, in this embodiment. However, the present invention is usable in another type of system wherein such operations are effected at different timing. The individual structures are advantageous, and in addition, the combination thereof is further preferable.

Figure 1B:
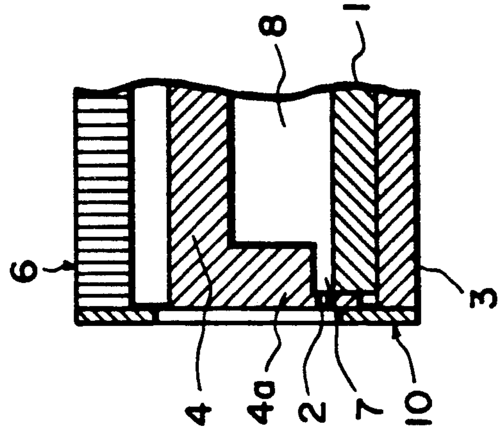
FIG. 1B is a sectional view taken along a line I—I of FIG. 1A.
Figure 1A:
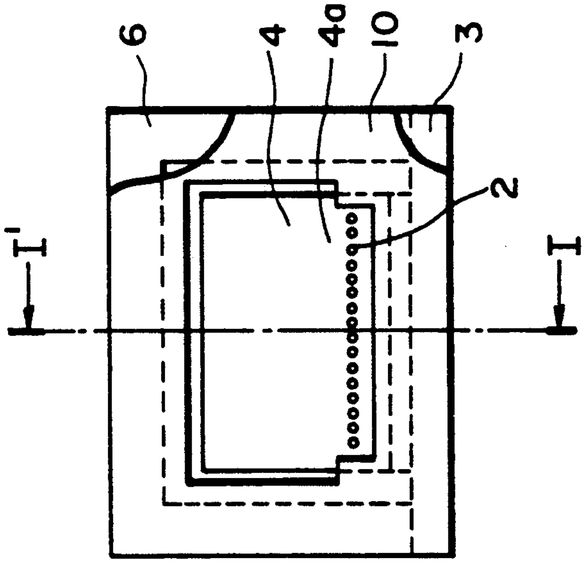
FIG. 1A is a front view of an ink jet head according to an embodiment of the present invention.

As shown in FIGS. 1A and 1B, a heater board 1 has an silicon substrate, an unshown electrothermal transducer (ejection heater) (not shown) and aluminum wiring for supplying electric power thereto. An orifice plate 4A has ejection outlets 2 for permitting ejection of the ink therethrough. A top or base has recesses for defining ink passages 7 and a common liquid chamber 8.

The assembly provided by connecting the heater board 1 and the top or base plate 4 is supported by a metal supporting member 3, and is supported by an outer casing 6 of an ink supply member for a supplying ink to the ink passage 7. A front seal plate 10 is mounted to press a part of the periphery of the orifice plate 4a to buffer the stepped portions between the assembly and the outer casing 6 and between the supporting plate 3 and the orifice plate 4a, by the contact thereof to the supporting member 3 and the outer casing 6 of the ink supply member.

The front seal plate 10 applies pressure to a part of a zone extending in the direction of the array of the ejection outlets 2 where the orifice plate 4a and the heater board 1 are joined and a region adjacent the ejection outlets 2 where the sides of the orifice plate 4a and the heater board 1 are joined, and the pressure is not applied to the other region by proper formation of the opening of the front seal plate 10. By the front seal plate 10 having such an opening, the orifice plate 4a is pressed to and bonded to the heater board 1, as shown in FIGS. 1A and 1B.

Then, even if the outer casing 6 of the ink supply member contracts or expands due to an ambient temperature change, and the front seal plate 10 to which the outer casing 6 is bonded receives force thereby, the force from the front seal plate 10 tending to deform the orifice plate 4a is significantly reduced because the front seal plate 10 and the orifice, plate 4a one joined only along part of their surfaces. The same applies to the other constituent elements. Even when another force is applied to the orifice plate 4a due to the difference in the coefficients to thermal expansion as when the ambient temperature changes or the temperature rise of the head rises due to a long term operation, the deformation of the orifice plate 4a and the subsequent formation production of a crack therein can be suppressed, since the stress is eased by the reduction of the bonding regions.

Accordingly, deformation of or cracking production in the orifice plate 4a of the top or base plate 4 attributable to the difference in thermal expansion coefficient can be effectively prevented.

In the embodiment of FIGS. 1A and 1B, only the region of the ejection outlet 2 is bound, and therefore, the stress can transfer to the other regions, by which the stress adjacent to the ejection outlets 2 can be effectively eased, so that the ejecting operation is not influenced.

According to the present invention, by reducing the contact or bonding region between the orifice plate 4a and the front seal plate 10 applying pressure to the orifice plate 4a, the deformation of the front seal plate 10 is not transmitted to the orifice plate 4a, and the contact region between the front seal plate 10 and the orifice plate 4a includes a region for releasing the stress tending to deform the orifice plate.

The configuration of the contact area between the front seal plate 10 and the orifice plate 4a is not limited to those of the foregoing embodiment. For example, only one side of the orifice plate 4a is out of contact, and the remaining three sides are contacted, as an alternative. In a further alternative, three sides are non-contact sides, and only one side is a contact side.

In addition, the front seal plate 10 and the orifice plate 4a may be bonded to each other continuously along the entire side, or the bonding tact may be discontinuous.

The ink jet head cartridge having the structure shown in FIG. 1A and described in the foregoing was left at a temperature of −30° C., and it was confirmed that neither deformation nor cracks were produced in the orifice plate.

Figure 7B:
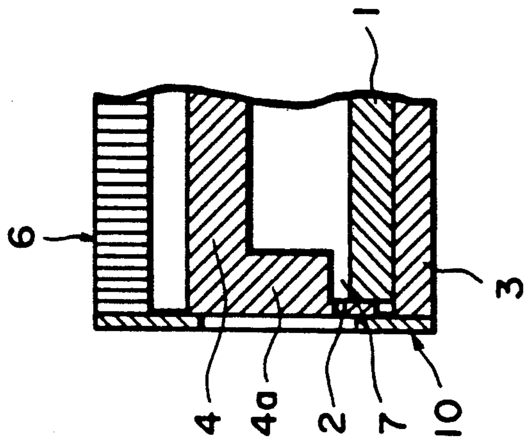
FIG. 7B is a sectional view taken along line II—II' of FIG. 7A.
Figure 7A:
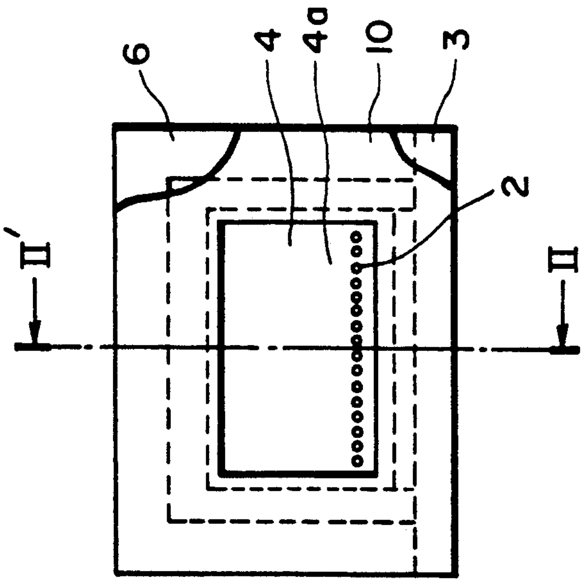
FIG. 7A is a front view of an ink jet head according to an embodiment of the present invention.

The cartridge of FIG. 7A in which the front seal plate and the orifice plate are bonded along the entire region, was left under the same conditions. Deformation and the cracks in the orifice plate were produced in 80–100% of the tested cartridges.

The present invention is particularly suited for use in a bubble jet recording head and recording apparatus developed by Canon Kabushiki Kaisha, Japan. This is because, high density of the picture elements, and high resolution of recording are possible.

The typical structure and the operational principle are disclosed in U.S. Pat. Nos. 4,723,129 and 4,740,796. The principle is applicable to a so-called on-demand type recording system and a continuous type recording system particularly suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provide by the electrothermal transducer to produce film boiling on the heating portion of the recording head, whereby a bubble can be formed in the liquid (ink) corresponding to each of the driving signals. By the development and collapse of the the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably that such as disclosed in U.S. Pat. Nos. 4,463,359, 4,345,262. In addition, the temperature increasing rate of the heating surface is preferably in accordance with that disclosed in U.S. Pat. No. 4,313,124.

The structure of the recording head may be as is shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application Publication No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because the present invention is effective to perform the recording operation with certainty and high efficiency irrespective of the type of the recording head.

The present invention is effectively applicable to a so-called full-line type recording head having a length corresponding to the maximum recording width. Such a recording head may comprise either a single recording head or a plural recording head combined to cover the entire width.

In addition, the present invention is applicable to a serial type recording head wherein the recording head is fixed on the main assembly, to a replaceable chip type recording head which is connected electrically with the main apparatus and can be supplied with the ink by being mounted in the main assembly, or to a cartridge type recording head having an integral ink container.

The provision of the recovery means and the auxiliary means for the preliminary operation are preferable, because they can further stabilize the effect of the present invention. As for such means, there are capping means for the recording head, cleaning means therefore, pressing or sucking means, preliminary heating means by the ejection electrothermal transducer or by a combination of the ejection electrothermal transducer and additional heating element and means for preliminary ejection not for the recording operation, which can stabilize the recording operation.

As regards the kinds of the recording head mountable, it may be a single head corresponding to a single color ink, or there may be plural heads corresponding to the plurality of ink materials having different recording colors or density. The present invention is effectively applicable to an apparatus having at least one of a monochromatic mode mainly using black and a multicolor using different color ink materials and a full-color mode by the mixture of the colors, which may be an integrally formed recording unit or a combination of plural recording heads.

Furthermore, in the foregoing embodiment, the ink has been liquid. It may be, however, an ink material solidified at the room temperature or below and liquefied at room temperature. Since in the ink jet recording system, the ink temperature is not less than 30° C. and not more than 70° C., to stabilize the viscosity of the ink to provide the stabilized ejection, the ink is such that it is liquid within the temperature range when the recording signal is applied. In addition, the temperature rise due to the thermal energy is positively prevented by using this energy to effect the state change of the ink from the solid state to the liquid state, or the ink material is solidified when it is left is used to prevent the evaporation of the ink. In either of the cases, the application of the recording signal producing thermal energy, the ink may be liquefied, and the liquefied ink may be ejected. The ink may start to be solidified at the time when it reaches the recording material. The present invention is applicable to such an ink material as is liquefied by the application of the thermal energy. Such an ink material may be retained as a liquid or solid material stored in through holes or recesses formed in a porous sheet as disclosed in Japanese Laid-Open Patent Application No. 56847/1979 and Japanese Laid-Open Patent Application No. 71260/1985. The sheet faces the electrothermal transducers. The most effective one for the ink materials described above is the film boiling system.

The ink jet recording apparatus may be used as an output terminal of an information processing apparatus such as computer or the like, a copying apparatus combined with an image reader or the like, or a facsimile machine having information sending and receiving functions.

According to the present invention, at least one side of the four sides of the orifice plates is not bonded with the front seal plate, and therefore, even if the front seal is influenced by the difference in the thermal expansions of various elements, the force applied to the orifice plate can be significantly reduced, and the deformation or cracking of the orifice plate of the top plate can be prevented.

Therefore, the cause of the print quality degradation can be avoided, and therefore, an ink jet recording head cartridge and an ink jet recording apparatus using the same can reliably be provided which can produce high quality prints reliably under various conditions.

While the invention has been described with reference to the structures disclosed herein, it is not confined to the details set forth and this application is intended to cover such modifications or changes as may come within the purposes of the improvements or the scope of the following claims.

What is claimed is:

1. A recording head comprising:

a first member having an integral orifice plate portion having a line of ink discharge outlets through which ink is discharged, and a base plate portion having grooves communicating with said discharge outlets;

a second member joined with said first member to form passages for the ink and having electrothermal transducers for generating thermal energy contributable to discharge of the ink; and a thin plate member defining a through-opening having a periphery for exposing the discharge outlets and externally urging said orifice plate portion against said second member at an end remote from said base plate portion, said thin plate member extending along said line of ink discharge outlets.

2. An ink jet recording apparatus comprising:

a recording head including:

a first member having an integral orifice plate portion having a line of ink discharge outlets through which ink is discharged, and a base plate portion having grooves communicating with said discharge outlets, a second member joined with said first member to form passages for the ink and having electrothermal transducers for generating thermal energy contributable to discharge of the ink, and a thin plate member defining a through-opening having a periphery for exposing the discharge outlets and externally urging said orifice plate portion against said second member at an end remote from said base plate portion, said thin plate member extending along said line of ink discharge outlets; and a reciprocably movable carriage for mounting said recording head.

3. An ink jet recording apparatus comprising:

a recording head including:

a first member having an integral orifice plate portion having a line of ink discharge outlets through which ink is discharged, and a base plate portion having grooves communicating with said discharge outlets, a second member joined with said first member to form passages for the ink and having electrothermal transducers for generating thermal energy contributable to discharge of the ink, and a thin plate member defining a through-opening having a periphery for exposing the discharge outlets and externally urging said orifice plate portion against said second member at an end remote from said base plate portion, said thin plate member extending along said line of ink discharge outlets; and capping means for capping the discharge outlets of said recording head.

4. An ink cartridge comprising:

a recording head including:

a first member having an integral orifice plate portion having a line of ink discharge outlets through which ink is discharged, and a base plate portion having grooves communicating with said discharge outlets, a second member joined with said first member to form passages for the ink and having electrothermal transducers for generating thermal energy contributable to discharge of the ink, and a thin plate member defining a through-opening having a periphery for exposing the discharge outlets and externally urging said orifice plate portion against said second member at an end remote from said base plate portion, said thin plate member extending along said line of ink discharge outlets; and an ink container connected with the passages formed by said first and second member.

5. A recording head according to claim 1, wherein said thin plate member encloses said line of ink discharge outlets along three sides of said first member.

* * * * *

UNITED STATES PATENT AND TRADEMARK OFFICE
CERTIFICATE OF CORRECTION

PATENT NO. : 5,189,443

DATED : February 23, 1993

INVENTOR(S) : TERUO ARASHIMA, ET AL.

It is certified that error appears in the above-identified patent and that said Letters Patent is hereby corrected as shown below:

Title page,
IN [56] REFERENCES CITED

Under U.S. PATENT DOCUMENTS:
"4,599,528" should read --4,599,628--.
Title page, col. 2,
Under FOREIGN PATENT DOCUMENTS: "048009 9/1990 Japan" should read --55-121081 9/1980 Japan--.

COLUMN 1

Line 6, "No. 583,656," should read --No. 583,565,--.
Line 27, "outlet" should read --outlets--.

COLUMN 2

Line 20, "a" should be deleted.
Line 24, "in to" should read --in disturbances to--.
Line 50, "is" should read --are--.
Line 62, "is" should read --are--.

COLUMN 3

Line 2, "capping" should read --and capping--.
Line 13, "an" should read --and an--.
Line 20, "in the" should be deleted.
Line 44, "heat" should read --head--.
Line 57, "heat" should read --head--.

COLUMN 4

Line 5, "AC." should read --HC.--.

UNITED STATES PATENT AND TRADEMARK OFFICE
CERTIFICATE OF CORRECTION

PATENT NO. : 5,189,443
DATED : February 23, 1993
INVENTOR(S) : TERUO ARASHIMA, ET AL.

It is certified that error appears in the above-identified patent and that said Letters Patent is hereby corrected as shown below:

COLUMN 5

Line 59, "is" should read --are--.

COLUMN 6

Line 6, "tacted to" should read --tacting--.
Line 12, "existing" should be deleted.
Line 22, "port 1400," should read --port 1401,--.
Line 24, "port 1400." should read --port 1401.--.
Line 35, "cube" should read --rectangular--.

COLUMN 7

Line 67, "the" should be deleted.

COLUMN 8

Line 3, "take" should read --takes--.

COLUMN 9

Line 9, "400" should read --4000--.
Line 36, "creases" should read --crease--.

COLUMN 10

Line 44, "toward," should read --moved toward the--.
Line 63, "an silicon" should read --a silicon--.
Line 67, "base" should read --base plate 4--.

UNITED STATES PATENT AND TRADEMARK OFFICE

CERTIFICATE OF CORRECTION

PATENT NO. : 5,189,443

DATED : February 23, 1993

INVENTOR(S) : TERUO ARASHIMA, ET AL.

It is certified that error appears in the above-identified patent and that said Letters Patent is hereby corrected as shown below:

COLUMN 11

Line 29, "orifice," should read --orifice--.
Line 33, "to" should read --of--.
Line 34, "rise" should be deleted.
Line 37, "production" should read --or production--.
Line 67, "tact" should be deleted.

COLUMN 12

Line 14, "because," should read --because--.
Line 20, "system" should read --system. It is--.
Line 26, "provide" should read --provided--.
Line 31, "the the" should read --the--.
Line 55, "wave" should read --waves--.

COLUMN 13

Line 9, "therefore," should read --therefor,--.

--

UNITED STATES PATENT AND TRADEMARK OFFICE

CERTIFICATE OF CORRECTION

PATENT NO. : 5,189,443

DATED : February 23, 1993

INVENTOR(S) : TERUO ARASHIMA, ET AL.

It is certified that error appears in the above-identified patent and that said Letters Patent is hereby corrected as shown below:

COLUMN 16

Line 9, "member." should read --members.--.

Signed and Sealed this

Seventeenth Day of May, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,189,443

DATED : February 23, 1993

INVENTOR(S) : TERUO ARSHIMA, ET AL.

It is certified that error appears in the above-identified patent and that said Letters Patent is hereby corrected as shown below:

IN THE DRAWINGS

Sheet 6 of 6, FIG. 7A and FIG. 7B should be labelled --PRIOR ART--.

COLUMN 3

Line 49, "an" should read --a conventional-- and "head according" should read --head.--.

Line 50, delete entire line.

Signed and Sealed this

Twentieth Day of June, 1995

Attest:

Bruce Lehman

BRUCE LEHMAN

*Attesting Officer*

*Commissioner of Patents and Trademarks*